United States Patent
Daly, Jr.

(10) Patent No.: US 11,772,667 B1
(45) Date of Patent: Oct. 3, 2023

(54) OPERATING A VEHICLE IN RESPONSE TO DETECTING A FAULTY SENSOR USING CALIBRATION PARAMETERS OF THE SENSOR

(71) Applicant: PlusAI, Inc., Cupertino, CA (US)

(72) Inventor: Timothy P. Daly, Jr., San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/835,636

(22) Filed: Jun. 8, 2022

(51) Int. Cl.
*B60W 50/029* (2012.01)
*B60W 50/02* (2012.01)
*B60W 60/00* (2020.01)
*B60W 50/00* (2006.01)

(52) U.S. Cl.
CPC ...... *B60W 50/029* (2013.01); *B60W 50/0205* (2013.01); *B60W 60/0053* (2020.02); *B60W 60/0059* (2020.02); *B60W 2050/0088* (2013.01); *B60W 2050/0215* (2013.01);
(Continued)

(58) Field of Classification Search
CPC ........... B60W 50/029; B60W 50/0205; B60W 60/0053; B60W 60/0059; B60W 2050/0088; B60W 2050/0215; B60W 2050/0295; B60W 2300/125; B60W 2420/42; B60W 2420/52
See application file for complete search history.

(56) References Cited

U.S. PATENT DOCUMENTS

| 1,231 A | 7/1839 | Clark |
| 4,866,422 A | 9/1989 | Dunnett et al. |
| 6,178,744 B1 | 1/2001 | Perset |
(Continued)

FOREIGN PATENT DOCUMENTS

| CN | 111026081 A | * 4/2020 | ......... G05B 23/0213 |
| DE | 10 2013 202240 A1 | 8/2014 | |
(Continued)

OTHER PUBLICATIONS

English Translation: Dong, CN 111026081 A, Apr. 2020, Chinese Patent Office Publication (Year: 2020).*
(Continued)

*Primary Examiner* — Nadeem Odeh
(74) *Attorney, Agent, or Firm* — Sheppard Mullin Richter & Hampton LLP

(57) ABSTRACT

In an embodiment, a processor is configured to perform, while a vehicle is driving in an uncontrolled environment, a self-calibration routine for each sensor from the plurality of sensors to determine at least one calibration parameter value associated with that sensor. The processor is further configured to determine, while the vehicle is driving in the uncontrolled environment, and automatically in response to performing the self-calibration routine, that at least one sensor from the plurality of sensors has moved and/or is inoperative based on the at least one calibration parameter value associated with the at least one sensor being outside a predetermined acceptable range. The processor is further configured to perform, in response to determining that at least one sensor from the plurality of sensors has moved and/or is inoperative, at least one remedial action at the vehicle while the vehicle is driving in the uncontrolled environment.

20 Claims, 4 Drawing Sheets

200

Perform, while a vehicle is driving in an uncontrolled environment, a self-calibration routine for each sensor from a plurality of sensors included in the vehicle to determine at least one calibration parameter value associated with that sensor 201

Determine, while the vehicle is driving in the uncontrolled environment, and automatically in response to performing the self-calibration routine, that at least one sensor from the plurality of sensors has moved and/or is inoperative based on the at least one calibration parameter value associated with the at least one sensor being outside a predetermined acceptable range 202

Perform at least one remedial action at the vehicle while the vehicle is driving in the uncontrolled environment 203

(52) U.S. Cl.
CPC ............. *B60W 2050/0295* (2013.01); *B60W 2300/125* (2013.01); *B60W 2420/42* (2013.01); *B60W 2420/52* (2013.01)

(56) References Cited

U.S. PATENT DOCUMENTS

| | | |
|---|---|---|
| 6,954,047 B2 | 10/2005 | Neubauer |
| 7,315,237 B2 | 1/2008 | Shimonomoto et al. |
| 7,337,650 B1 | 3/2008 | Preston et al. |
| 7,388,616 B2 | 6/2008 | Yamazaki |
| 9,457,733 B2 | 10/2016 | Schutz |
| 9,669,771 B1 | 6/2017 | Helm |
| 10,040,406 B2 | 8/2018 | Da Deppo et al. |
| 10,310,298 B2 | 6/2019 | Wang et al. |
| 10,397,982 B2 | 8/2019 | Usami et al. |
| 10,578,716 B1 | 3/2020 | Hu et al. |
| 10,697,810 B1 | 6/2020 | Tjaden, Jr. et al. |
| 10,717,411 B1 | 7/2020 | Diehl et al. |
| 10,723,281 B1 | 7/2020 | Briggs |
| 10,793,094 B2 | 10/2020 | Salter et al. |
| 10,829,091 B2 | 11/2020 | Herman et al. |
| 10,836,353 B2 | 11/2020 | Zaharia |
| 10,848,744 B2 | 11/2020 | Petniunas et al. |
| 10,867,489 B1 | 12/2020 | Diehl et al. |
| 10,953,814 B2 | 3/2021 | Bulgajewski et al. |
| 10,989,542 B2 | 4/2021 | Zhang et al. |
| 11,076,109 B2 | 7/2021 | Nie |
| 11,077,825 B2 | 8/2021 | Agarwal |
| 11,084,357 B2 | 8/2021 | Huber |
| 11,163,312 B2 | 11/2021 | Gist, IV et al. |
| 11,180,119 B2 | 11/2021 | Dingli |
| 11,209,456 B2 | 12/2021 | Nichols et al. |
| 11,313,704 B2 | 4/2022 | Li et al. |
| 2003/0227382 A1 | 12/2003 | Breed |
| 2004/0246111 A1 | 12/2004 | Oyagi et al. |
| 2006/0250500 A1 | 11/2006 | Gloger |
| 2007/0119156 A1 | 5/2007 | Hill et al. |
| 2007/0160510 A1 | 7/2007 | Schultz et al. |
| 2007/0217091 A1 | 9/2007 | Florin et al. |
| 2008/0074265 A1 | 3/2008 | Schoen et al. |
| 2008/0270076 A1 | 10/2008 | Breed |
| 2009/0095074 A1 | 4/2009 | Vinshtok et al. |
| 2009/0095075 A1 | 4/2009 | Vinshtok et al. |
| 2009/0147360 A1 | 6/2009 | Oskarsson et al. |
| 2009/0160667 A1 | 6/2009 | Musele et al. |
| 2009/0167538 A1 | 7/2009 | Merritt et al. |
| 2010/0171628 A1 | 7/2010 | Stansfield |
| 2010/0204877 A1 | 8/2010 | Schwartz |
| 2011/0011180 A1 | 1/2011 | Wilson |
| 2011/0037585 A1 | 2/2011 | Wang et al. |
| 2011/0161043 A1 | 6/2011 | Semmelrodt |
| 2012/0110982 A1 | 5/2012 | McMackin et al. |
| 2013/0028588 A1 | 1/2013 | Suman et al. |
| 2013/0033381 A1 | 2/2013 | Breed |
| 2013/0300550 A1 | 11/2013 | Potter |
| 2014/0104048 A1 | 4/2014 | De Kock et al. |
| 2014/0182147 A1 | 7/2014 | Munroe et al. |
| 2014/0266654 A1 | 9/2014 | Parker |
| 2014/0266668 A1 | 9/2014 | Blankenship et al. |
| 2014/0334080 A1 | 11/2014 | Kurle |
| 2015/0123838 A1 | 5/2015 | Shi |
| 2015/0183380 A1 | 7/2015 | Da Deppo et al. |
| 2015/0185592 A1 | 7/2015 | Eineren et al. |
| 2015/0274089 A1 | 10/2015 | Schutz |
| 2015/0360649 A1 | 12/2015 | Neff |
| 2016/0005164 A1 | 1/2016 | Roumeliotis et al. |
| 2016/0063704 A1 | 3/2016 | Sasaki et al. |
| 2016/0156816 A1 | 6/2016 | Brown |
| 2016/0264064 A1 | 9/2016 | Byrne et al. |
| 2016/0272163 A1 | 9/2016 | Dreiocker et al. |
| 2016/0282468 A1 | 9/2016 | Gruver et al. |
| 2016/0297361 A1 | 10/2016 | Drazan et al. |
| 2016/0297437 A1 | 10/2016 | Hara et al. |
| 2016/0361980 A1 | 12/2016 | Huber |
| 2017/0057461 A1 | 3/2017 | Gaskin |
| 2017/0058565 A1 | 3/2017 | Sanchez et al. |
| 2017/0123293 A1 | 5/2017 | Yuen et al. |
| 2017/0176576 A1 | 6/2017 | Kotelnikov et al. |
| 2017/0274523 A1 | 9/2017 | Sato |
| 2017/0295610 A1 | 10/2017 | Usami et al. |
| 2017/0316683 A1 | 11/2017 | Pietrasik et al. |
| 2017/0334366 A1 | 11/2017 | Sliwa et al. |
| 2017/0357009 A1 | 11/2017 | Pietrasik et al. |
| 2017/0364039 A1 | 12/2017 | Schober et al. |
| 2018/0029760 A1 | 2/2018 | Maser |
| 2018/0088331 A1 | 3/2018 | Wall |
| 2018/0088577 A1* | 3/2018 | Kim .................. B60W 60/005 |
| 2018/0091717 A1 | 3/2018 | Ion |
| 2018/0093644 A1 | 4/2018 | Lin et al. |
| 2018/0113331 A1 | 4/2018 | Wang et al. |
| 2018/0123631 A1 | 5/2018 | Hessabi |
| 2018/0128644 A1 | 5/2018 | Lurcott et al. |
| 2018/0251099 A1 | 9/2018 | Satarino et al. |
| 2018/0307238 A1 | 10/2018 | Wisniewski |
| 2018/0345865 A1 | 12/2018 | Maxwell |
| 2018/0370500 A1 | 12/2018 | Garcia et al. |
| 2019/0001989 A1* | 1/2019 | Schoenfeld ..... B60W 60/00186 |
| 2019/0031116 A1 | 1/2019 | Bulgajewski et al. |
| 2019/0047385 A1 | 2/2019 | Archer |
| 2019/0051015 A1* | 2/2019 | Gonzalez Aguirre .... G06T 7/97 |
| 2019/0057586 A1 | 2/2019 | Kangralkar et al. |
| 2019/0066318 A1 | 2/2019 | Giancola et al. |
| 2019/0068847 A1 | 2/2019 | Obi |
| 2019/0077376 A1 | 3/2019 | Baldovino et al. |
| 2019/0092287 A1 | 3/2019 | Leach et al. |
| 2019/0210567 A1 | 7/2019 | Frederick et al. |
| 2019/0259176 A1 | 8/2019 | Dai |
| 2019/0331509 A1 | 10/2019 | Pizzimenti et al. |
| 2019/0377072 A1 | 12/2019 | Astrom et al. |
| 2019/0384232 A1 | 12/2019 | Casey et al. |
| 2020/0025788 A1 | 1/2020 | Camarda et al. |
| 2020/0064483 A1 | 2/2020 | Li et al. |
| 2020/0079387 A1 | 3/2020 | A.G. et al. |
| 2020/0082188 A1 | 3/2020 | Singh |
| 2020/0094784 A1 | 3/2020 | Herman et al. |
| 2020/0112657 A1 | 4/2020 | Stein et al. |
| 2020/0124443 A1 | 4/2020 | Chen et al. |
| 2020/0131971 A1 | 4/2020 | Moras et al. |
| 2020/0142187 A1 | 5/2020 | Hu et al. |
| 2020/0142426 A1 | 5/2020 | Gist, IV et al. |
| 2020/0148133 A1 | 5/2020 | Lin et al. |
| 2020/0150677 A1 | 5/2020 | Walters et al. |
| 2020/0156592 A1 | 5/2020 | Zaharia |
| 2020/0159010 A1 | 5/2020 | Kuwae et al. |
| 2020/0160633 A1 | 5/2020 | Zhang et al. |
| 2020/0200566 A1 | 6/2020 | Kim et al. |
| 2020/0207358 A1 | 7/2020 | Katz et al. |
| 2020/0217666 A1 | 7/2020 | Zhang et al. |
| 2020/0225715 A1 | 7/2020 | Goergen et al. |
| 2020/0233940 A1 | 7/2020 | Edwards |
| 2020/0247359 A1 | 8/2020 | Murray et al. |
| 2020/0262377 A1 | 8/2020 | Salter et al. |
| 2020/0271689 A1 | 8/2020 | Nichols et al. |
| 2020/0275033 A1 | 8/2020 | Petniunas et al. |
| 2020/0331435 A1 | 10/2020 | Dingli |
| 2020/0348138 A1 | 11/2020 | Le et al. |
| 2020/0391698 A1 | 12/2020 | Fukuda et al. |
| 2020/0406908 A1 | 12/2020 | Soryal |
| 2021/0051252 A1 | 2/2021 | Cotoros et al. |
| 2021/0084235 A1 | 3/2021 | Nie |
| 2021/0094512 A1 | 4/2021 | Kovach |
| 2021/0123754 A1 | 4/2021 | Mordechai et al. |
| 2021/0129797 A1 | 5/2021 | Zaharia |
| 2021/0173055 A1 | 6/2021 | Jian et al. |
| 2021/0179019 A1 | 6/2021 | Agarwal |
| 2021/0179025 A1 | 6/2021 | Li et al. |
| 2021/0181000 A1 | 6/2021 | Li et al. |
| 2021/0181318 A1 | 6/2021 | Li et al. |
| 2021/0181502 A1 | 6/2021 | Li et al. |
| 2021/0183179 A1 | 6/2021 | Agarwal |
| 2021/0185207 A1 | 6/2021 | Li et al. |
| 2021/0372314 A1 | 12/2021 | Weigl et al. |
| 2021/0373567 A1 | 12/2021 | Horesh |
| 2022/0063558 A1 | 3/2022 | Agarwal |

(56) References Cited

U.S. PATENT DOCUMENTS

2022/0187843 A1      6/2022  Wang
2022/0252437 A1      8/2022  Li et al.
2022/0417404 A1     12/2022  Li et al.
2023/0066919 A1*     3/2023  Navin ............... B60W 50/0205

FOREIGN PATENT DOCUMENTS

DE   10 2016 006 039 A1   11/2016
EP          1 702 819 A1    9/2016
EP          3 228 508 A1   10/2017
JP          2009-081765 A    4/2009
WO         2019/067206 A1    4/2019

OTHER PUBLICATIONS

Extended European Search Report dated Apr. 28, 2021 for European Application No. 20214056.2, 7 pages.
Espacenet English machine translation of DE 10 2013 202240 A1, 30 pages.

* cited by examiner

200

Perform, while a vehicle is driving in an uncontrolled environment, a self-calibration routine for each sensor from a plurality of sensors included in the vehicle to determine at least one calibration parameter value associated with that sensor 201

Determine, while the vehicle is driving in the uncontrolled environment, and automatically in response to performing the self-calibration routine, that at least one sensor from the plurality of sensors has moved and/or is inoperative based on the at least one calibration parameter value associated with the at least one sensor being outside a predetermined acceptable range 202

Perform at least one remedial action at the vehicle while the vehicle is driving in the uncontrolled environment 203

Perform, while a vehicle is driving in an uncontrolled environment and at a first time, a self-calibration routine for a sensor included in the vehicle to determine a first calibration parameter value associated with the sensor 301

Determine, while the vehicle is driving in the uncontrolled environment and automatically in response to performing the self-calibration routine at the first time, that the sensor has moved and/or is inoperative based on the first calibration parameter value being outside a first predetermined acceptable range 302

Perform, while the vehicle is driving in the uncontrolled environment and at a second time different than the first time, the self-calibration routine for the sensor to determine a second calibration parameter value associated with the sensor 303

Determine, while the vehicle is driving in the uncontrolled environment and automatically in response to performing the self-calibration routine at the second time, that the sensor has moved and/or is inoperative based on the second calibration parameter value being outside a second predetermined acceptable range 304

Perform, while the vehicle is driving in the uncontrolled environment and in response to determining that the sensor has moved and/or is inoperative based on at least one of the first calibration parameter value being outside the first predetermined acceptable range or the second calibration parameter value being outside the second predetermined acceptable range, at least one remedial action at the vehicle 305

Receive, at a compute device, a plurality of calibration parameter values associated with a plurality of sensors obtained via a plurality of self-calibration routines performed at a plurality of vehicles communicably coupled to and remote from the compute device while the plurality of vehicles are driving in an uncontrolled environment 401

↓

Analyze, while the plurality of vehicles are driving in the uncontrolled environment, each calibration parameter value from the plurality of calibration parameter values 402

↓

Determine, while the plurality of vehicles are driving in the uncontrolled environment, that a sensor from the plurality of sensors included in a vehicle from the plurality of vehicles has moved and/or is inoperative in response to a calibration parameter value from the plurality of calibration parameter values being outside a predetermined acceptable range associated with the sensor, the calibration parameter value associated with the sensor and obtained automatically in response to performing a self-calibration routine from the plurality of self-calibration routines for the sensor 403

↓

Perform, while the plurality of vehicles are driving, a remedial action 404

FIG. 4

OPERATING A VEHICLE IN RESPONSE TO DETECTING A FAULTY SENSOR USING CALIBRATION PARAMETERS OF THE SENSOR

FIELD

One or more embodiments are related to operating a vehicle (e.g., autonomous vehicle) in response to detecting a faulty sensor using calibration parameters of the sensors.

BACKGROUND

Vehicles, such as autonomous vehicles, typically rely on sensors to operate. For example, the vehicles may rely on data collected by sensors to autonomously drive the vehicle, determine a location of the vehicle, monitor passenger behavior, and/or the like. As such, sensors collecting sensor data that accurately and completely represents an area(s) of interest can be desirable. To collect sensor data that accurately and completely represents an area(s) of interest, it can be desirable to ensure that the sensors collecting such sensor data are operating as desired and remaining consistent in location relative to the vehicle.

SUMMARY

In an embodiment, an apparatus includes a memory, a plurality of sensors, and a processor operatively coupled to the memory and the plurality of sensors. The processor is configured to perform, while a vehicle is driving in an uncontrolled environment, a self-calibration routine for each sensor from the plurality of sensors to determine at least one calibration parameter value associated with that sensor. The processor is further configured to determine, while the vehicle is driving in the uncontrolled environment, and automatically in response to performing the self-calibration routine, that at least one sensor from the plurality of sensors has moved and/or is inoperative based on the at least one calibration parameter value associated with the at least one sensor being outside a predetermined acceptable range. The processor is further configured to perform, in response to determining that at least one sensor from the plurality of sensors has moved and/or is inoperative, at least one remedial action at the vehicle while the vehicle is driving in the uncontrolled environment.

In an embodiment, a non-transitory processor-readable medium stores code representing instructions to be executed by one or more processors. The instructions comprise code to cause the one or more processors to perform, while a vehicle is driving in an uncontrolled environment and at a first time, a self-calibration routine for a sensor included in the vehicle to determine a first calibration parameter value associated with the sensor. The instructions further comprise code to cause the one or more processors to determine, while the vehicle is driving in the uncontrolled environment and automatically in response to performing the self-calibration routine at the first time, that the sensor has moved and/or is inoperative based on the first calibration parameter value being outside a first predetermined acceptable range. The instructions further comprise code to cause the one or more processors to perform, while the vehicle is driving in the uncontrolled environment and at a second time different than the first time, the self-calibration routine for the sensor to determine a second calibration parameter value associated with the sensor. The instructions further comprise code to cause the one or more processors to determine while the vehicle is driving in the uncontrolled environment and automatically in response to performing the self-calibration routine at the second time, that the sensor has moved and/or is inoperative based on the second calibration parameter value being outside a second predetermined acceptable range. The instructions further comprise code to cause the one or more processors to perform, while the vehicle is driving in the uncontrolled environment and in response to determining that the sensor has moved and/or is inoperative based on at least one of the first calibration parameter value being outside the first predetermined acceptable range or the second calibration parameter value being outside the second predetermined acceptable range, at least one remedial action at the vehicle.

In an embodiment, a method includes receiving, by a processor of a compute device, a plurality of calibration parameter values associated with a plurality of sensors obtained via a plurality of self-calibration routines performed at a plurality of vehicles communicably coupled to and remote from the compute device while the plurality of vehicles are driving in an uncontrolled environment. The method further includes analyzing, by the processor and while the plurality of vehicles are driving in the uncontrolled environment, each calibration parameter value from the plurality of calibration parameter values. The method further includes determining, by the processor and while the plurality of vehicles are driving in the uncontrolled environment, that a sensor from the plurality of sensors included in a vehicle from the plurality of vehicles has moved and/or is inoperative in response to a calibration parameter value from the plurality of calibration parameter values being outside a predetermined acceptable range associated with the sensor. The calibration parameter value is associated with the sensor and obtained automatically in response to performing a self-calibration routine from the plurality of self-calibration routines for the sensor. The method further includes performing, by the processor, while the plurality of vehicles are driving, and in response to the determining, a remedial action.

BRIEF DESCRIPTION OF THE DRAWINGS

FIG. 2 shows a flowchart of a method for performing at least one remedial action in response to determining that at least one sensor has moved and/or is inoperative based on analysis of one or more calibration parameter values, according to an embodiment.

FIG. 3 shows a flowchart of a method for repeatedly analyzing one or more calibration parameter values at different times to determine if a remedial action should occur, according to an embodiment.

FIG. 4 shows a flowchart of a method for performing a remedial action in response to determining that that a sensor has moved and/or is inoperative, according to an embodiment.

DETAILED DESCRIPTION

Figure 1:
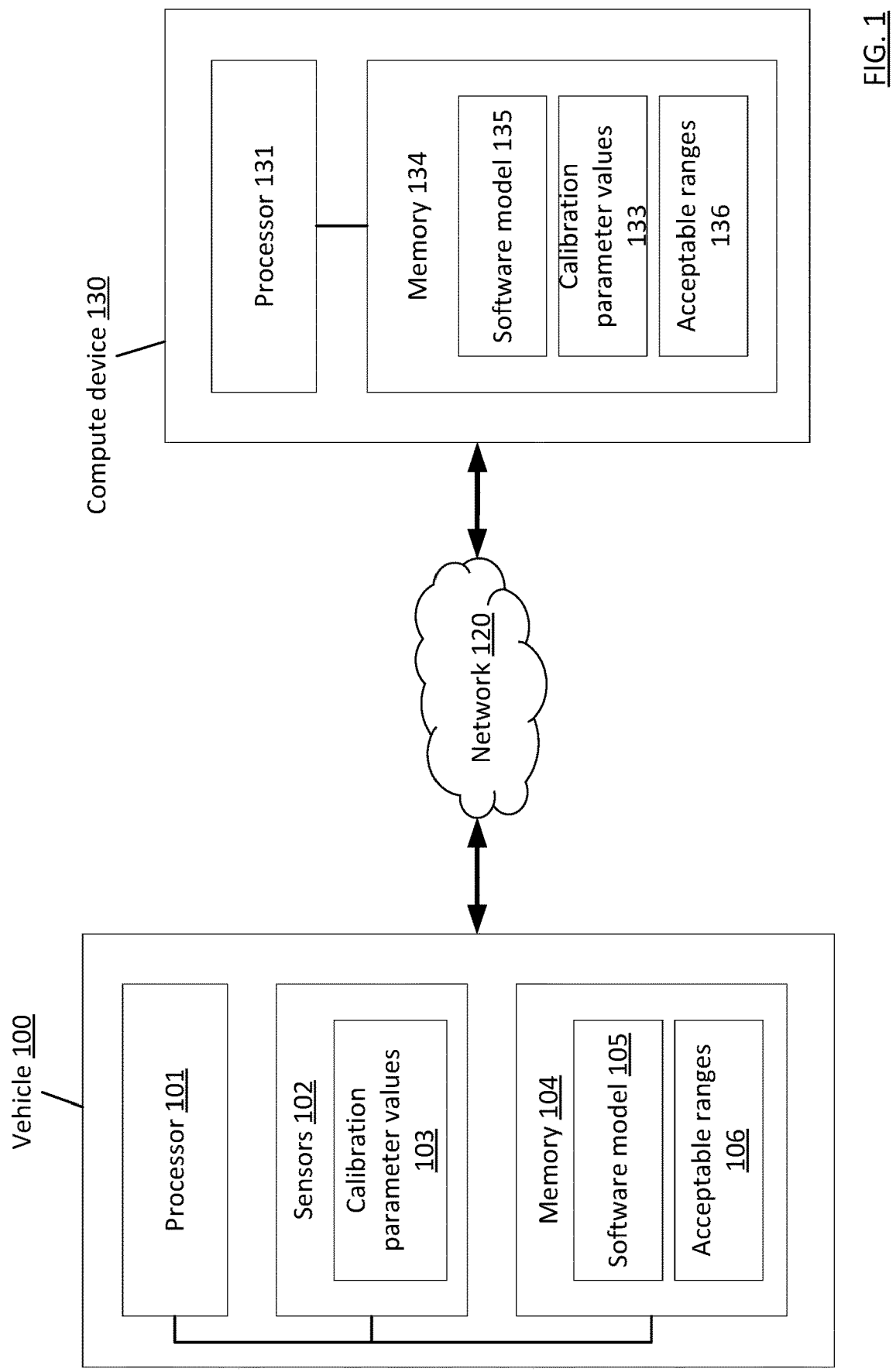
FIG. 1 shows a block diagram that includes a vehicle and a compute device, according to an embodiment.

Vehicles can include sensors, such as for example radars, lidars, cameras, internal measurement units (IMUs), microphones, global positioning systems, and/or the like. In some implementations, the sensors can be calibrated, and calibration parameter values can be measured/determined from the calibration. These calibration parameter values can be analyzed to determine what, if any, sensors are inoperative and/or have moved relative to the vehicle by comparing the calibration parameter values with associated predetermined acceptable calibration parameter value ranges.

One advantage provided by some techniques described herein is that the sensor(s) that has moved and/or is inoperative can be detected quickly and efficiently (e.g., by a vehicle). Risks posed by relying on sensors that have moved and/or are inoperative are thus mitigated quickly and efficiently.

Additionally, in some implementations, the detection that a sensor(s) has moved and/or is inoperative can be performed without human intervention. This can eliminate a user(s) having to manually verify that the sensor(s) is still operative and/or has not changed location. This can lead to, for example, savings in costs and/or more accurate analysis of the sensor(s).

Additionally, in some implementations, the detection that a sensor(s) has moved and/or is inoperative can be performed for a heavy vehicle (e.g., a semi-truck). For a relatively larger and/or heavier vehicle, accurately and/or quickly analyzing that vehicle's surroundings can be particularly desirable (e.g., to reduce risk for other vehicles on the road) compared to smaller and/or light vehicles.

Additionally, in some implementations, the detection that a sensor has moved and/or is inoperative can be performed for a vehicle that operates fully autonomously and/or partially-autonomously. Ensuring that a sensor(s) has not moved and/or is operative can be more important for vehicles operating with an element of autonomy compared to vehicles that do not.

Additionally, in some implementations, the detection that a sensor(s) has moved and/or is inoperative can be performed while the vehicle is moving (e.g., driving) and/or in an uncontrolled environment (e.g., not in a factory, not in a laboratory, a place without precisely regulated environmental factors, etc.). As such, the vehicle does not need to stop moving and/or to travel to a controlled environment (e.g., factory, laboratory, a place with precisely regulated environmental factors, etc.) prior to checking if a sensor(s) has moved and/or is inoperative. As such, a vehicle can detect that a sensor(s) has moved, has not moved, is inoperative, or is operative, faster and with more flexibility (e.g., at a greater range of operating configurations, such as at any location, while the vehicle is parked, while the vehicle is pulled over to a shoulder, while the vehicle is driving on a road, etc.).

In some implementations, a sensor moving refers to a physical location of the sensor changing relative to the vehicle by a distance greater than a predetermined threshold (e.g., by one millimeter, by one centimeter, by one inch, etc.). In some implementations, a sensor being inoperative refers to the sensor being damaged, the sensor outputting faulty values, the sensor performing undesirably, the sensor performing sub-optimally, the sensor not having power, the sensor failing to output sensor data, and/or the like.

FIG. 1 shows a block diagram that includes a vehicle 100 and a compute device 130. The vehicle 100 can be operatively coupled to the compute device 130 via a network 120.

The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The vehicle 100 includes a processor 101, sensors 102, and memory 104, each operatively coupled to one another (e.g., via a system bus). The vehicle 100 can operate in a fully autonomous mode (and not a partially-autonomous or manual mode), a partially-autonomous mode (and not a fully autonomous or manual mode), a manual mode (and not a fully autonomous or partially-autonomous mode), or a combination thereof. In some implementations, the vehicle 100 operates at a level of autonomy between 1 and 5 (level 1: driver assistance; level 2: partial driving automation; level 3: conditional automation; level 4: high automation; level 5: full automation). In some implementations, the vehicle 100 can be a medium truck, heavy truck, very heavy truck, semi-truck, greater than 14,000 pounds, greater than 26,000 pounds, greater than 70,000 pounds, or greater than 80,000 pounds.

The processor 101 can be, for example, a hardware based integrated circuit (IC) or any other suitable processing device configured to run and/or execute a set of instructions or code. For example, the processor 101 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 101 can be configured to run any of the methods and/or portions of methods discussed herein.

The sensors 102 include one or more cameras (e.g., one camera, multiple cameras), one or more radars (e.g., one radar, multiple radars), one or more lidars (e.g., one lidar, multiple radars), one or more inertial measurement units (IMU) (e.g., one IMU, multiple IMUS), one or more gyroscopes (e.g., one gyroscope, multiple gyroscopes), one or more accelerometers (e.g., one accelerometer, multiple accelerometers), one or more microphones (e.g., one microphone, multiple microphones), and/or the like. The sensors 102 can be located on the vehicle 100 such that sensor data indicating attributes of the vehicle 100 (e.g., speed, acceleration rate, location, lane position, etc.), a surrounding environment of the vehicle 100 (e.g., nearby obstacles and their attributes, lane markers and their attributes, weather, etc.), a driver of the vehicle 100 (e.g., posture, facial expression, heart rate, speech, movements, mental state, etc.), and/or the like can be gathered. For example, sensors 102 can be located at an exterior of the vehicle 100 (e.g., on the roof) and/or at an interior of the vehicle 100 (e.g., inside a cab). Additional information related to the sensors 102 and/or how at least some sensors from sensor 102 can be arranged on the vehicle 100, according to one or more embodiments, are discussed at U.S. patent application Ser. No. 16/715,499, the contents of which are incorporated by reference herein in its entirety.

The sensors 102 can be associated with (e.g., measure, generate, have, etc.) calibration parameter values 103. Calibration parameter values 103 can include values for multiple different types of calibration parameters. Calibration parameters can refer to parameters of a sensor that can be calibrated. The calibration parameter values 103 can include values that are intrinsic calibration parameters and/or extrinsic calibration parameters. In some implementations, intrinsic calibration parameters refer to parameters associated with a given sensor from the sensors 102 that does not depend on the external environment and how the given sensor is placed within the outside world. The intrinsic calibration parameters can be generated from/identified by performing one or more intrinsic calibrations. In some implementations, extrinsic calibration parameters refer to parameters that describe the pose (e.g., position and/or orientation) of a given sensor from sensors 102 with respect to an external frame of reference. In some implementations, extrinsic calibration parameters can additionally refer to parameters that describe a surrounding of a given sensor from sensors 102, such as weather, temperature, vibrations by the vehicle 100, and/or the like. The extrinsic calibration parameters can be generated from/identified by performing one or more extrinsic calibrations.

The calibration parameter values 103 can be generated from one or more self-calibration routines. Different self-calibrations can occur for different types of sensors. The one or more self-calibration routines can include intrinsic calibration and/or extrinsic calibrations. The self-calibration routines can be performed at any time, and can be performed repeatedly (e.g., continuously, periodically, in response to a triggering event, etc.).

In some implementations, self-calibration routines for IMUs can include performing bias estimation and/or determining mounting orientation (e.g., rotation with respect to a frame of the vehicle 100, like a roll/pitch offset). The IMUs can include accelerometers and gyroscopes. Bias for an accelerometer included in an IMU can be estimated, for example, using a function(s) that includes integrating and comparing position change (e.g., using a global positioning system (GPS)) of the accelerometer. Bias for a gyroscope included in an IMU can be estimated, for example, using a function(s) that includes differencing angular velocity of the gyroscope with angular velocity from a magnetometer (e.g., included in vehicle 100) and/or the accelerometer, and applying a low-pass filter thereafter.

In some implementations, self-calibration routines for cameras can include determining rotation and translation with respect to another sensor (e.g., IMU), a frame of the vehicle 100, extrinsic parameters of the camera, and/or intrinsic parameters of the camera (e.g., focal length, distortion, rolling shutter time, etc.). In some implementations, self-calibration routines for cameras can use a structure-from-motion technique(s) and/or a simultaneous localization and mapping (SLAM) technique(s) that includes the calibration parameters of the cameras to be generated/determined in the set of states for the structure-from-motion technique(s) and/or a simultaneous localization and mapping (SLAM) technique(s). In some implementations, self-calibration routines for cameras can include using heuristics, such as comparing estimated camera motion with the estimated motion of an IMU or GPS, or searching for/identifying features, such as a ground plane (e.g., road) and/or vanishing point (e.g., points at infinity) from lines in a scene (e.g., surrounding environment of the vehicle 100). In some implementations, given a set of sensor motions from map construction, self-calibration routines for cameras can include using a hand/eye calibration technique(s) to determine extrinsic parameters with respect to another sensor (e.g., IMU). In some implementations, relative extrinsic parameters between a pair of cameras can be determined using bundle adjustment/structure from motion.

In some implementations, self-calibration routines for lidars can include determining orientation and translation with respect to another sensor (e.g., IMU), the frame of the vehicle 100, extrinsic parameters of the lidar, and/or intrinsic parameters of the lidar (e.g., per-beam angular corrections, per-beam intensity remittance correction, etc.). In some implementations, self-calibration routines for a lidar can include using a mapping technique(s) and/or SLAM technique(s) to determine, for example, motion, beam angle, and/or intensity biases of a the lidar. In some implementations, given a set of sensor motions from map construction, self-calibration routines for lidars can include using a hand-eye calibration technique(s) to determine extrinsic parameters with respect to another sensor (e.g., IMU). In some implementations, for a hand-eye calibration(s) with pitch and yaw rotations that are less than respective predetermined thresholds, a prior height value can be used. In some implementations, relative extrinsic parameters between a pair of lidars can be determined using scan matching.

In some implementations, self-calibration routines for radars can be similar to the self-calibration routines for lidars. For example, radars can be treated like low-resolution lidars for self-calibration routines. In some implementations, self-calibration routines for radars can include a scan matching technique(s), such as an iterative closes point (ICP) technique to make maps, and/or bundle adjustment/structure from motion (e.g., via cameras).

Each sensor from sensors 102 can be associated with a set of one or more calibration parameters and one or more sets of calibration parameter values from the calibration parameter values 103. The calibration parameter values 103 can be measured from self-calibration routines performed at the vehicle 100 at any time and/or location, such as while the vehicle 100 is in an uncontrolled environment, while the vehicle 100 is in a controlled environment, while the vehicle 100 is moving, and/or while the vehicle 100 is not moving. In some implementations, the calibration parameter values 103 refer to calibration parameter values measured in an uncontrolled environment, and does not include calibration parameter values measured in a controlled environment. The calibration parameter values 103 can represent values for one or more different calibration parameters across a time and/or represent values for one or more different calibration parameters at a moment in time.

In some implementations, sensors 102 includes a camera, and a set of calibration parameter values from calibration parameter values 103 associated with the camera can include values for intrinsic calibration parameters (e.g., focal length, optical center, scale factor, principal point, skew, geometric distortion, distortion, rolling shutter time, etc.) and/or extrinsic calibration parameters (e.g., pose of the camera with respect to another sensor, pose of the camera with respect to a marker, pose of the camera with respect to an object in a surrounding environment of the vehicle 100, pose of the camera with respect to any other point of reference, etc.).

In some implementations, sensors 102 includes a radar, and a set of calibration parameter values from the calibration parameter values 103 associated with the radar can include values for intrinsic calibration parameters (e.g., operating frequency, wavelength, beamwidth, pulse width, pulse repetition frequency, antenna radiation pattern, peak output power, etc.) and/or extrinsic calibration parameters (e.g., pose of the radar with respect to another sensor, pose of the radar with respect to a marker, pose of the radar with respect to an object in a surrounding environment of the vehicle 100, pose of the radar with respect to any other point of reference, etc.).

In some implementations, sensors 102 include a lidar, and a set of calibration parameter values from the calibration parameter values 103 associated with the lidar can include values for intrinsic calibration parameters (e.g., beam intensity, point density, field-of-view, scan pattern, timestamp offset, beam angular offsets, per-beam angular corrections, per-beam intensity remittance correction, etc.) and/or extrinsic calibration parameters (e.g., pose of the lidar with respect to another sensor, pose of the lidar with respect to a marker, pose of the lidar with respect to an object in a surrounding environment of the vehicle 100, pose of the lidar with respect to any other point of reference, etc.).

In some implementations, sensors 102 include a IMU, and a set of calibration parameter values from the calibration parameter values 103 associated with the IMU can include values for intrinsic calibration parameters (e.g., accelerometer bias, gyroscope bias, thermal response, sensitivity, sample rate, linearity, noise level, etc.) and/or extrinsic calibration parameters (e.g., pose of the IMU with respect to another sensor, pose of the IMU with respect to a marker, pose of the IMU with respect to an object in a surrounding environment of the vehicle 100, pose of the IMU with respect to any other point of reference, etc.).

The memory 104 can be, for example, a random-access memory (RAM), a memory buffer, a hard drive, a read-only memory (ROM), an erasable programmable read-only memory (EPROM), and/or the like. The memory 104 can be configured to store sensor data (not shown in FIG. 1) collected by the sensor 102, data received from a separate compute device (not shown in FIG. 1), and any other data used by the processor 101 to perform the techniques discussed herein. In some instances, the memory 104 can store, for example, one or more software programs and/or code that can include instructions to cause the processor 101 to perform one or more processes, functions, and/or the like described herein. In some embodiments, the memory 104 can include extendible storage units that can be added and used incrementally. In some implementations, the memory 104 can be a portable memory (for example, a flash drive, a portable hard disk, and/or the like) that can be operatively coupled to the processor 101. In some instances, the memory 104 can be remotely operatively coupled with the compute device. For example, a remote database device (not shown) can serve as a memory and be operatively coupled to the vehicle 100.

The memory 104 can include (e.g., store) acceptable ranges 106. Acceptable ranges 106 can include multiple sets of acceptable ranges for the calibration parameters associated with the sensors 102/calibration parameter values 103. One or more calibration parameter values from calibration parameter values 103 being outside one or more associated acceptable ranges from acceptable ranges 106 can indicate that one or more sensors from sensors 102 associated with the one or more calibration parameter values have moved (e.g., relative to the vehicle and/or other sensors) and/or are inoperative. For example, a single calibration parameter value for a sensor being outside an acceptable range associated with the calibration parameter for that single calibration parameter value can indicate that the sensor is inoperative and/or has moved (e.g., relative to the vehicle and/or other sensors). As another example, a predetermined combination of multiple calibration parameter values for a sensor being outside the acceptable ranges associated with those multiple calibration parameters can indicate that the sensor is inoperative and/or has moved (e.g., relative to the vehicle and/or other sensors).

Note that, in some instances, a calibration parameter value(s) for a sensor being within an acceptable range(s) associated with the calibration parameter(s) for that calibration parameter value(s) may not be sufficient to conclude that the sensor has not moved and/or is not inoperative. Additionally or alternatively, a calibration parameter value(s) for a sensor being within an acceptable range(s) associated with the calibration parameter(s) for that calibration parameter value(s) may be sufficient to conclude that the sensor has not moved and/or is not inoperative. Additionally or alternatively, a calibration parameter value(s) for a sensor being outside an acceptable range(s) associated with the calibration parameter(s) for that calibration parameter value(s) may be sufficient to indicate that the sensor has moved and/or is inoperative. Additionally or alternatively, a calibration parameter value(s) for a sensor being outside an acceptable range(s) associated with the calibration parameter(s) for that calibration parameter value(s) may not be sufficient to indicate that the sensor has moved and/or is inoperative.

In some implementations, the extrinsic parameter values for an extrinsic parameter changing (e.g., rotation (roll, pitch, yaw) and/or translation (x, y, z)), can indicate that a sensor has moved and/or the data produced by the sensor is faulty. In some implementations, a camera's focal length, resolution, or field of view estimated by self-calibration routines being outside respective acceptable ranges could indicate that the camera is inoperative (e.g., the camera is the wrong type of camera, the camera has a loose lens, etc.). In some implementations, if a mapping algorithm (e.g., structure from motion, SLAM, etc.) is used to estimate a sensor's motion, and if the trajectory cannot be made to match the vehicle trajectory estimated by another sensor (e.g., a GPS and/or IMU), the sensor may be inoperative and outputting faulty data (e.g., biased, corrupted by noise, incomplete, etc.).

As an example, acceptable ranges 106 can include a focal length range for a camera included in sensors 102, where the focal length of the camera being outside the focal length range may indicate that the camera has moved and/or is inoperative. As another example, the acceptable ranges 106 can include a scale factor range and optical center range for the same camera, where the scale factor of the camera being outside the scale factor range and the optical center being outside the optical center range indicates that the camera has moved and/or is inoperative.

In some implementations, a first set of acceptable ranges from acceptable ranges 106 are associated with intrinsic calibration parameters, where an intrinsic calibration parameter value(s) for a sensor being outside an associated acceptable range(s) for that calibration parameter(s) indicates that the sensor is inoperative (but does indicate that the sensor has moved). In some implementations, a second set of acceptable ranges (different than the first set of acceptable ranges) from acceptable ranges 106 are associated with extrinsic calibration parameters, where an extrinsic calibration parameter value(s) for a sensor being outside an associated acceptable range(s) for that calibration parameter(s)

indicates that the sensor has moved (but does not indicate that the sensor is inoperative).

In some implementations, a sensor not producing data (e.g., no images, no point clouds, etc.) that can be used for self-calibration could indicate that the sensor is inoperative (e.g., fully inoperative). In some implementations, a sensor producing data that is incomplete can indicate that the sensor is inoperative (e.g., partially inoperative), such as a lidar with missing beams, shorter beams, and/or less beams that before, or a camera with missing pixels and/or less pixels than before. In some implementations, where motion of a sensor is predicted/determined using odometry (e.g., mapping, SLAM, etc.), the sensor producing data that is misaligned and/or shifting (e.g., pixels produced by a camera that are shifting to a side, beams produced by a lidar that become misaligned, etc.) could cause a biased motion estimate of the vehicle 100 to be received that does not match the actual trajectory of the vehicle 100, indicating that the sensor is potentially inoperative (e.g., partially inoperative).

In some implementations, the acceptable ranges 106 can be determined (e.g., by a human and/or by software model 105) based on the sensor characteristics, historical data of the sensors 102, or a combination thereof. Said similarly, for each sensor from sensor 102, the acceptable ranges for that sensor can be determined by considering that sensor's characteristics (e.g., sensor type, age, amount of usage, location at vehicle 100, model, size, weight, etc.) and/or previous calibration parameter values of that sensor and/or other sensors that are similar to that sensor (e.g., same sensor type, same sensor model, etc.). In some implementations, previous calibration parameter values can refer to calibration parameter values measured in a controlled environment (and optionally, not calibration parameter values measured in an uncontrolled environment). In some implementations, the acceptable ranges 106 can be determined based on predetermined/known tolerance to errors of software models (e.g., software models 105 and/or a different software model not shown in FIG. 1) consuming/analyzing sensor data produced by sensors 102. For example, a software model that estimates the position of a driving lane using sensor data from a camera may have a specified angular and/or translational error tolerance, where the specified angular and/or translational error tolerance can factor into the determination of acceptable range(s) associated with the calibration parameter values for that camera.

For example, the acceptable beam intensity range for a lidar can be determined based on characteristics of the lidar itself. Additionally or alternatively, the acceptable beam intensity range for a lidar can be determined based on previous beam intensity values for the lidar and/or other sensors similar to the lidar (e.g., other lidars, other lidars that are the same model, etc.). For instance, previous beam intensity values for the lidar and/or other sensors similar to the lidar can be collected, a mean or median beam intensity can be calculated from the previous beam intensity values, and the acceptable beam intensity range can be set as a range that is within a predetermined range of the mean or median (e.g., 10%, 25%, 33%, 50%, etc.).

The memory 104 can also include (e.g., store) a software model 105. The software model 105 can be, for example, an artificial intelligence (AI) model, machine learning (ML) model, analytical model, mathematical model, or a combination thereof. In some implementations, the software model 105 can be used to determine the acceptable ranges 106. In some implementations, the software model 105 can be used to compare the calibration parameter values 103 to the acceptable ranges 106 to determine if a sensor is inoperative, determine what sensor is inoperative, determine the cause or source of a sensor being inoperative, determine if a sensor has moved relative to the vehicle and/or another sensor(s), determine what sensor has moved, determine how much a sensor moved, determine to where a sensor has moved, etc.

In some implementations, one or more remedial actions can occur in response to determining that one or more sensors from sensors 102 have moved and/or are inoperative. For example, a mode of the vehicle 100 can change, such as changing a current driving mode of the vehicle 100 to at least one of a fully autonomous driving mode, a partially-autonomous driving mode, a manual driving mode, eco mode, sports mode, four-wheel drive, two-wheel drive, etc. As another example, sensor data collected by the one or more sensors determined to have moved and/or be inoperative can be modified to account for the movement or inoperative functionality prior to usage. As another example, sensor data collected by the one or more sensors determined to have moved and/or be inoperative can be ignored/not used. As another example, the vehicle can send an alert (e.g., visual alert, sound, vibration) to a passenger (e.g., driver) of the vehicle 100 and/or a different compute device not shown in FIG. 1. The alert can trigger the passenger to perform an action in response to receiving the alert, such as manually changing a mode of operation of the vehicle 100, manually performing a driving maneuver (e.g., slowing down, pulling over to a shoulder, etc.), and/or any other mitigating action that can reduce risk of the vehicle 100 operating with a sensor that has moved and/or is faulty. As another example, the vehicle 100 can go out of operational design domain (ODD).

As an example scenario, focal length values generated by a camera in a controlled environment, as well as attributes of the camera itself, are used to generate an acceptable focal length range for the camera. As the vehicle 100 drives in an uncontrolled environment, a self-calibration routine can be performed at the camera to measure the camera's focal length. In some instances, if the focal length is not within the acceptable focal length range, the camera is determined to have moved and/or be inoperative. If the camera is determined to have moved and/or be inoperative, a remedial action can occur/be triggered.

As another example scenario, pose (e.g., position and orientation) data of a camera in a controlled environment is used to generate an acceptable pose range for the camera. As the vehicle 100 drives in an uncontrolled environment, the camera's pose can be determined via a self-calibration routine performed at the camera and/or sensor data collected by other sensors (e.g., other cameras, other radars, other lidars, etc.). In some instances, if the camera's pose is not within the acceptable pose range, the camera is determined to have moved and/or be inoperative. If the camera is determined to have moved and/or be inoperative, and a remedial action can occur/be triggered.

As another example scenario, pulse repetition frequency (PRF) values generated by a radar in a controlled environment, as well as attributes of the radar itself, are used to generate an acceptable PRF range for the radar. As the vehicle 100 drives in an uncontrolled environment, a self-calibration routine is performed at the radar to measure the radar's PRF. In some instances, if the PRF is not within the acceptable PRF range, the radar is determined to have moved and/or be inoperative. If the radar is determined to have moved and/or be inoperative, and a remedial action can occur/be triggered.

As another example scenario, pose data of a radar in a controlled environment is used to generate an acceptable pose range for the radar. As the vehicle 100 drives in an uncontrolled environment, the radar's pose can be determined via a self-calibration routine performed at the radar and/or sensor data collected by other sensors (e.g., other cameras, other radars, other lidars, etc.). In some instances, if the radar's pose is not within the acceptable pose range, the radar is determined to have moved and/or be inoperative. If the radar is determined to have moved and/or be inoperative, and a remedial action can occur/be triggered.

As another example scenario, beam intensity values generated by a lidar in a controlled environment, as well as attributes of the lidar itself, are used to generate an acceptable beam intensity range for the lidar. As the vehicle 100 drives in an uncontrolled environment, a self-calibration routine is performed at the lidar to measure the lidar's beam intensity. In some instances, if the beam intensity is not within the acceptable beam intensity range, the lidar is determined to have moved and/or be inoperative. If the lidar is determined to have moved and/or be inoperative, and a remedial action can occur/be triggered.

As another example scenario, pose data of a lidar in a controlled environment is used to generate an acceptable pose range for the lidar. As the vehicle 100 drives in an uncontrolled environment, the lidar's pose can be determined via a self-calibration routine performed at the lidar and/or sensor data collected by other sensors (e.g., other cameras, other radars, other lidars, etc.). In some instances, if the lidar's pose is not within the acceptable pose range, the lidar is determined to have moved and/or be inoperative. If the lidar is determined to be moved and/or be inoperative, and a remedial action can occur/be triggered.

As another example scenario, sensitivity values generated by an IMU in a controlled environment, as well as attributes of the IMU itself, are used to generate an acceptable sensitivity range for the IMU. As the vehicle 100 drives in an uncontrolled environment, a self-calibration routine is performed at the IMU to measure the IMU's sensitivity. In some instances, if the sensitivity is not within the acceptable scale factor range, the IMU is determined to have moved and/or be inoperative. If the IMU is determined to be moved and/or be inoperative, and a remedial action occurs.

The compute device 130 includes a processor 131 operatively coupled to a memory 134 (e.g., via a system bus). The compute device 130 can be any type of compute device, such as a server, laptop, desktop, phone, and/or the like. The compute device 130 can be communicably coupled to a fleet of vehicles (i.e., a plurality of vehicles) via the network 120, where the fleet can include vehicle 100 and one or more other vehicles not shown in FIG. 1. In some implementations, the compute device 130 can serve to monitor sensors used by the fleet of vehicles to determine if sensors have moved and/or become inoperative. In some implementations, the compute device 130 can identify patterns and/or anomalies associated with the sensors included in the fleet. In some implementations, the compute device 130 can use The processor 131 can be, for example, a hardware based integrated circuit (IC) or any other suitable processing device configured to run and/or execute a set of instructions or code. For example, the processor 131 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 131 can be configured to run any of the methods and/or portions of methods discussed herein.

The memory 134 can be, for example, a random-access memory (RAM), a memory buffer, a hard drive, a read-only memory (ROM), an erasable programmable read-only memory (EPROM), and/or the like. The memory 134 can be configured to store any data used by the processor 131 to perform the techniques discussed herein. In some instances, the memory 134 can store, for example, one or more software programs and/or code that can include instructions to cause the processor 131 to perform one or more processes, functions, and/or the like such as those described herein. In some embodiments, the memory 134 can include extendible storage units that can be added and used incrementally. In some implementations, the memory 134 can be a portable memory (for example, a flash drive, a portable hard disk, and/or the like) that can be operatively coupled to the processor 131. In some instances, the memory 134 can be remotely operatively coupled with the compute device. For example, a remote database device (not shown) can serve as a memory and be operatively coupled to the vehicle 100.

The memory 134 can include (e.g., store) calibration parameter values 133. The calibration parameter values 133 can include calibration parameter values measured by a fleet of vehicles at one or more of the vehicles included within the fleet, where the fleet could include vehicle 100 and the calibration parameter values 133 could include calibration parameter values 103. The calibration parameter values 133 can be measured from self-calibration routines performed, for example, at each vehicle from a fleet of vehicles at any time and/or location, such as while the vehicles in the fleet are in an uncontrolled environment, while the vehicles in the fleet are in a controlled environment, while the vehicles in the fleet moving, and/or while the vehicles in the fleet are not moving. In some implementations, the calibration parameter values 133 refer to calibration parameter values measured in an uncontrolled environment, and does not include calibration parameter values measured in a controlled environment. The calibration parameter values 133 can represent, for example, values for one or more different calibration parameters at a given moment across a range of one or more different times.

The memory 134 can also include (e.g., store) acceptable ranges 136. Acceptable ranges 136 can be generated in a similar fashion as acceptable ranges 106. Acceptable ranges 136 can include ranges that are the same as acceptable ranges 106, ranges different than acceptable ranges 106, or a combination thereof. Acceptable ranges 136 can include multiple sets of ranges for the calibration parameters of calibration parameter values 133. One or more calibration parameter values from calibration parameter values 133 being outside one or more associated acceptable ranges from acceptable ranges 106 can indicate that one or more sensors have moved and/or are inoperative.

The memory 134 can also include (e.g., store) a software model 135. The software model 133 can be, for example, an artificial intelligence (AI) model, machine learning (ML) model, analytical model, mathematical model, or a combination thereof. In some implementations, the software model 135 can be used to determine the acceptable ranges 136. In some implementations, the software model 135 can be used to compare the calibration parameter values 133 to the acceptable ranges 136 to determine if a sensor is inoperative, determine what sensor is inoperative, determine the cause or source of a sensor being inoperative, determine if a sensor has moved relative to the vehicle and/or another sensor(s), determine what sensor has moved, determine how much a sensor moved, determine where a sensor has moved, etc.

In some implementations, the software model 135 can analyze the calibration parameter values 133 to identify patterns and/or anomalies. For example, the software model 135 might determine that a particular sensor moves and/or becomes inoperative for many (e.g., greater than 50%, greater than 75%, greater than 90%, etc.) vehicles in the fleet; in such a scenario, the compute device 130 could recommend, for example, that the particular sensor should receive additional investigation and/or be replaced (e.g., by a different model of the same sensor type). As another example, the software model 135 might determine that a particular subset of vehicles from the fleet have sensors that move and/or become inoperative, in which case, that subset of vehicles can be further analyzed (e.g., driving pattern, driver behavior, environmental conditions, etc.).

In some implementations, the software model 135 can update the acceptable ranges 136 based on the calibration parameter values 133. Furthermore, the acceptable ranges 136, after updating, can be sent to the fleet such that the acceptable ranges stored at the memories of vehicles in the fleet are also updated (e.g., via a software patch). As an example, if the calibration parameter values 133 indicate that the calibration parameter values for a type of sensor gradually shift over time (while not moving and/or becoming inoperative), the acceptable ranges for the calibration parameters of those calibration parameter values can also gradually update over time accordingly.

In some implementations, one or more remedial actions can occur in response to determining that one or more sensors have moved and/or are inoperative. For example, the compute device 130 can send a signal(s) to a vehicle(s) from the fleet having the one or more sensors to cause a mode of the vehicle(s) to change, such as changing a current driving mode of the vehicle(s) to at least one of a fully autonomous driving mode, a partially-autonomous driving mode, a manual driving mode, eco mode, sports mode, four-wheel drive, two-wheel drive, etc. As another example, the compute device 130 can send a signal(s) to the vehicle(s) from the fleet having the one or more sensors to cause sensor data collected by the one or more sensors to be modified to account for the movement or inoperative functionality prior to usage. As another example, the compute device 130 can send a signal(s) to the vehicle(s) from the fleet having the one or more sensors to cause sensor data collected by the one or more sensors to be ignored/not used. As another example, the compute device 130 can send a signal(s) to the vehicle(s) from the fleet having the one or more sensors to cause an alert (e.g., visual alert, sound, vibration) to be sent to a passenger (e.g., driver) of the vehicle(s).

As one example scenario, the compute device 130 is connected to a fleet of vehicles that includes vehicle 100. The compute device receives calibration parameter values 133 from the fleet of vehicles, where calibration parameter values 133 includes calibration parameter values 103. The compute device 130 compares each calibration parameter value from calibration parameter values 133 to an associated acceptable range from acceptable ranges 136; if that calibration parameter value is outside the associated acceptable range, the compute device 130 sends a signal to a vehicle from the fleet of vehicles that includes the sensor that measured that calibration parameter value to cause at least one remedial action to occur.

FIG. 2 shows a flowchart of a method 200 for performing at least one remedial action in response to determining that at least one sensor has moved and/or is inoperative based on analysis of one or more calibration parameter values, according to an embodiment. In some implementations, method 200 can be performed by processor 101.

At 201, a self-calibration routine for each sensor from a plurality of sensors (e.g., sensor 102) included in a vehicle (e.g., vehicle 100) is performed while the vehicle is driving in an uncontrolled environment to determine at least one calibration parameter value (e.g., included in calibration parameter values 103) associated with that sensor. At 202, a determination is made, while the vehicle is driving in the uncontrolled environment and automatically in response to performing the self-calibration routine at 201 (e.g., without requiring human input), that at least one sensor from the plurality of sensors has moved and/or is inoperative based on the at least one calibration parameter value associated with the at least one sensor being outside a predetermined acceptable range (e.g., included in acceptable ranges 106). At 203, at least one remedial action is performed at the vehicle while the vehicle is driving in the uncontrolled environment in response to determining at 202 that at least one sensor from the plurality of sensors has moved and/or is inoperative (e.g., automatically without requiring human input).

In some implementations of method 200, the plurality of sensors includes an IMU and at least one of a lidar, a radar, or a camera. In some implementations of method 200, the plurality of sensors includes an IMU and a plurality of cameras. In some implementations of method 200, the plurality of sensors includes a plurality of radars, a plurality of lidars, and a plurality of cameras. In some implementations, the plurality of sensors does not include any sensors that are not an IMU, a lidar, a radar, or a camera.

In some implementations of method 200, that sensor is a camera and the at least one calibration parameter value for that sensor is at least one of a focal length, an optical center, a scale factor, a principal point, a skew, a distortion, a rolling shutter time, or a geometric distortion associated with the camera. In some implementations of method 200, that sensor is an inertial measurement unit (IMU) and the at least one calibration parameter value is at least one of an accelerometer bias, a gyroscope bias, a thermal response, a sensitivity, a sample rate, a linearity, or a noise level associated with the IMU. In some implementations of method 200, that sensor is a radar and the at least one calibration parameter value is at least one of an operating frequency, a wavelength, a beamwidth, a pulse width, an antenna radiation pattern, a peak output power, or a pulse repetition frequency associated with the radar. In some implementations of method 200, that sensor is a lidar and the at least one calibration parameter value is at least one of a beam intensity, a point density, a field-of-view, a scan pattern, a timestamp offset, or a beam angular offset associated with the lidar.

In some implementations of method 200, the self-calibration routine for that sensor includes comparing a first motion of a first object and a second motion of a second object different than the first object, sensor data representing the first motion and the second motion captured by at least one sensor from the plurality of sensors. The first object could be any point of reference, such as another sensor, a marker, an object, and/or the like. The second object could be any point of reference, such as another sensor, a marker, an object, and/or the like.

In some implementations of method 200, the vehicle is operating in at least one of a fully autonomous driving mode or a partially-autonomous driving mode prior to the determining at 202, and the at least one remedial action causes the vehicle to initiate a process to operate the vehicle in a manual driving mode. In some implementations of method 200, the vehicle is operating in a manual driving mode, and the at least one remedial action causes the vehicle to refrain from initiating a process to operate the vehicle in at least one of a fully autonomous driving mode or a partially-autonomous driving mode; said similarly, the vehicle remains operating in the manual driving mode.

In some implementations of method 200, each sensor from the plurality of sensors is of a sensor type (e.g., camera, lidar, radar, IMU, etc.), and the predetermined acceptable range is determined based on a plurality of calibration parameter values obtained prior to the at least one calibration parameter value and associated with at least one of (1) that sensor or (2) at least one remaining sensor from the plurality of sensors and of the sensor type.

FIG. 3 shows a flowchart of a method 300 for repeatedly analyzing one or more calibration parameter values at different times to determine if a remedial action should occur, according to an embodiment. In some implementations, method 300 can be performed by processor 101.

At 301, a self-calibration routine for a sensor (e.g., included in sensor 102) included in a vehicle (e.g., vehicle 100) is performed while the vehicle is driving in an uncontrolled environment and at a first time to determine a first calibration parameter value (e.g., included in calibration parameter values 103) associated with the sensor. At 302, a determination is made, while the vehicle is driving in the uncontrolled environment and automatically (e.g., without requiring user input) in response to performing the self-calibration routine at the first time at 301, that the sensor has moved and/or is inoperative based on the first calibration parameter value being outside a first predetermined acceptable range (e.g., included in acceptable ranges 106).

At 303, the self-calibration routine is performed for the sensor while the vehicle is driving in the uncontrolled environment (e.g., can be a different location or the same location, though still uncontrolled) and at a second time different than the first time to determine a second calibration parameter value (e.g., included in calibration parameter values 103) associated with the sensor. The first calibration parameter value and the second calibration parameter value can be of the same calibration parameter type (e.g., both focal length values, both skew values, both beam intensity values, etc.).

At 304, a determination is made, while the vehicle is driving in the uncontrolled environment and automatically (e.g., without requiring human input) in response to performing the self-calibration routine at the second time at 303, that the sensor has moved and/or is inoperative based on the second calibration parameter value being outside a second predetermined acceptable range (e.g., included in acceptable ranges 106). At 305, at least one remedial action is performed at the vehicle while the vehicle is driving in the uncontrolled environment and in response to determining that the sensor has moved and/or is inoperative at 302 and/or 304. In some implementations, 305 can occur automatically without requiring human input in response to completing steps 302 and/or 304.

In some implementations of method 300, the at least one remedial action includes determining whether or not the vehicle is operating in a manual driving mode. The at least one remedial action can further include refraining from causing the vehicle to initiate a process to operate the vehicle in the manual driving mode in response to determining that that the vehicle is operating in a manual driving mode. The at least one remedial action can further include causing the vehicle to initiate the process to operate the vehicle in the manual driving mode in response to determining that the vehicle is not operating in the manual driving mode.

In some implementations of method 300, the first predetermined acceptable range is the same as the second predetermined acceptable range. In some implementations of method 300, the first predetermined acceptable range is different than the second predetermined acceptable range.

Some implementations of method 300 further include performing, while the vehicle is driving in the uncontrolled environment and at a third time after the second time and the first time, the self-calibration routine for the sensor to determine a third calibration parameter value associated with the sensor. Some implementations of method 300 further include determining that the sensor has moved and/or is inoperative based on the third calibration parameter value being outside a third predetermined acceptable range.

FIG. 4 shows a flowchart of a method 400 for performing a remedial action in response to determining that that a sensor has moved and/or is inoperative, according to an embodiment. In some implementations, method 400 is performed by processor 131 of compute device 130.

At 401, a plurality of calibration parameter values (e.g., calibration parameter values 133) associated with a plurality of sensors (e.g., sensors that include sensors 102) obtained via a plurality of self-calibration routines performed at a plurality of vehicles (e.g., a fleet of vehicles that includes vehicle 100) communicably coupled to and remote from a compute device (e.g., compute device 130) are received, by a processor (e.g., processor 131) of the compute device, while the plurality of vehicles are driving in an uncontrolled environment. The plurality of calibration parameter values can include different calibration parameters, the same calibration parameters, or a combination thereof. The plurality of self-calibration routines can include different self-calibration routines, the same calibration routines, or a combination thereof. At 402, each calibration parameter value from the plurality of calibration parameter values are analyzed, by the processor and while the plurality of vehicles are driving in the uncontrolled environment. At 403, a determination is made, by the processor and while the plurality of vehicles are driving in the uncontrolled environment, that a sensor from the plurality of sensors included in a vehicle from the plurality of vehicles has moved and/or is inoperative in response to a calibration parameter value from the plurality of calibration parameter values being outside a predetermined acceptable range (e.g., an acceptable range included in acceptable ranges 136) associated with the sensor. The calibration parameter value is associated with the sensor and obtained automatically in response to performing a self-calibration routine from the plurality of self-calibration routines for the sensor. At 404, a remedial action is performed by the processor, while the plurality of vehicles are driving, and in response to determining that the sensor has moved and/or is inoperative at 403.

In some implementations of method 400, the plurality of calibration parameter values include an extrinsic calibration parameter value and an intrinsic calibration parameter value. In some implementations of method 400, the plurality of calibration parameter values include a plurality of extrinsic calibration parameter values and a plurality of intrinsic calibration parameter values.

In some implementations of method 400, the plurality of vehicles include a plurality of heavy trucks. In some implementations of method 400, the plurality of vehicles include a plurality of autonomous heavy trucks (e.g., level 1-5).

In an embodiment, an apparatus comprises: a memory; a plurality of sensors; and a processor operatively coupled to the memory and the plurality of sensors, the processor configured to: perform, while a vehicle is driving in an uncontrolled environment, a self-calibration routine for each sensor from the plurality of sensors to determine at least one calibration parameter value associated with that sensor; determine, while the vehicle is driving in the uncontrolled environment, and automatically in response to performing the self-calibration routine, that at least one sensor from the plurality of sensors has moved and/or is inoperative based on the at least one calibration parameter value associated with the at least one sensor being outside a predetermined acceptable range; and perform, in response to determining that at least one sensor from the plurality of sensors has moved and/or is inoperative, at least one remedial action at the vehicle while the vehicle is driving in the uncontrolled environment.

In some implementations, the plurality of sensors includes an inertial measurement unit and at least one of a lidar, a radar, or a camera.

In some implementations, the plurality of sensors includes an inertial measurement unit and a plurality of cameras.

In some implementations, that sensor is a camera and the at least one calibration parameter value for that sensor is at least one of a focal length, an optical center, a scale factor, a principal point, a skew, a distortion, a rolling shutter time, or a geometric distortion associated with the camera.

In some implementations, that sensor is an inertial measurement unit (IMU) and the at least one calibration parameter value is at least one of an accelerometer bias, a gyroscope bias, a thermal response, a sensitivity, a sample rate, a linearity, or a noise level associated with the IMU.

In some implementations, that sensor is a radar and the at least one calibration parameter value is at least one of an operating frequency, a wavelength, a beamwidth, a pulse width, an antenna radiation pattern, a peak output power, or a pulse repetition frequency associated with the radar.

In some implementations, that sensor is a lidar and the at least one calibration parameter value is at least one of a beam intensity, a point density, a field-of-view, a scan pattern, a timestamp offset, or a beam angular offset associated with the lidar.

In some implementations, the self-calibration routine for that sensor includes comparing a first motion of a first object and a second motion of a second object different than the first object, sensor data representing the first motion and the second motion captured by at least one sensor from the plurality of sensors.

In some implementations, the vehicle is operating in at least one of a fully autonomous driving mode or a partially-autonomous driving mode prior to the determining, and the at least one remedial action causes the vehicle to initiate a process to operate the vehicle in a manual driving mode.

In some implementations, the vehicle is operating in a manual driving mode, and the at least one remedial action causes the vehicle to refrain from initiating a process to operate the vehicle in at least one of a fully autonomous driving mode or a partially-autonomous driving mode.

In some implementations, each sensor from the plurality of sensors is of a sensor type, and the predetermined acceptable range is determined based on a plurality of calibration parameter values obtained prior to the at least one calibration parameter value and associated with at least one of (1) that sensor or (2) at least one remaining sensor from the plurality of sensors and of the sensor type.

In an embodiment, a non-transitory processor-readable medium stores code representing instructions to be executed by one or more processors, the instructions comprising code to cause the one or more processors to: perform, while a vehicle is driving in an uncontrolled environment and at a first time, a self-calibration routine for a sensor included in the vehicle to determine a first calibration parameter value associated with the sensor; determine, while the vehicle is driving in the uncontrolled environment and automatically in response to performing the self-calibration routine at the first time, that the sensor has moved and/or is inoperative based on the first calibration parameter value being outside a first predetermined acceptable range; perform, while the vehicle is driving in the uncontrolled environment and at a second time different than the first time, the self-calibration routine for the sensor to determine a second calibration parameter value associated with the sensor; determine while the vehicle is driving in the uncontrolled environment and automatically in response to performing the self-calibration routine at the second time, that the sensor has moved and/or is inoperative based on the second calibration parameter value being outside a second predetermined acceptable range; and perform, while the vehicle is driving in the uncontrolled environment and in response to determining that the sensor has moved and/or is inoperative based on at least one of the first calibration parameter value being outside the first predetermined acceptable range of the second calibration parameter value being outside the second predetermined acceptable range, at least one remedial action at the vehicle.

In some implementations, the at least one remedial action includes: determine whether or not the vehicle is operating in a manual driving mode; in response to determining that that the vehicle is operating in a manual driving mode, refrain from causing the vehicle to initiate a process to operate the vehicle in the manual driving mode; and in response to determining that the vehicle is not operating in the manual driving mode, cause the vehicle to initiate the process to operate the vehicle in the manual driving mode.

In some implementations, the first predetermined acceptable range is the same as the second predetermined acceptable range.

In some implementations, the first predetermined acceptable range is different than the second predetermined acceptable range.

In some implementations, the code further comprises code to cause the one or more processors to: perform, while the vehicle is driving in the uncontrolled environment and at a third time after the second time and the first time, the self-calibration routine for the sensor to determine a third calibration parameter value associated with the sensor; and determine that the sensor has moved and/or is inoperative based on the third calibration parameter value being outside a third predetermined acceptable range.

In an embodiment, a method comprises receiving, by a processor of a compute device, a plurality of calibration parameter values associated with a plurality of sensors obtained via a plurality of self-calibration routines performed at a plurality of vehicles communicably coupled to and remote from the compute device while the plurality of vehicles are driving in an uncontrolled environment; analyzing, by the processor and while the plurality of vehicles are driving in the uncontrolled environment, each calibration parameter value from the plurality of calibration parameter values; determining, by the processor and while the plurality of vehicles are driving in the uncontrolled environment, that a sensor from the plurality of sensors included in a vehicle from the plurality of vehicles has moved and/or is inoperative in response to a calibration parameter value from the plurality of calibration parameter values being outside a predetermined acceptable range associated with the sensor, the calibration parameter value associated with the sensor and obtained automatically in response to performing a self-calibration routine from the plurality of self-calibration routines for the sensor; and performing, by the processor, while the plurality of vehicles are driving, and in response to the determining, a remedial action.

In some implementations, the plurality of calibration parameter values include an extrinsic calibration parameter value and an intrinsic calibration parameter value.

In some implementations, the plurality of sensors includes an inertial measurement unit (IMU), a camera, a radar, and a lidar.

In some implementations, the plurality of vehicles include a plurality of autonomous heavy trucks.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

A vehicle can operate in a manual driving mode, or a vehicle can operate in a manual driving mode during one time period and operate in a partially autonomous mode or a fully autonomous driving mode during a different time period.

Autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A system comprising:
   at least one processor; and
   a memory storing instructions that, when executed by the at least one processor, cause the system to perform operations comprising:
      performing, while a vehicle is moving, an intrinsic self-calibration routine and an extrinsic self-calibration routine for each sensor of a plurality of sensors to determine at least one intrinsic calibration parameter value and at least one extrinsic calibration parameter value associated with that sensor, wherein the at least one extrinsic calibration parameter value is associated with at least one of: weather, temperature, and vibration;
      determining, while the vehicle is moving, based on the intrinsic self-calibration routine and the extrinsic self-calibration routine, the at least one sensor of the plurality of sensors has moved or is inoperative based on at least one of: the at least one intrinsic calibration parameter value associated with the at least one sensor being outside a predetermined acceptable range for the at least one intrinsic calibration parameter value and the at least one extrinsic calibration parameter value associated with the at least one sensor being outside a second predetermined acceptable range for the at least one extrinsic calibration parameter value; and
      performing, at least one remedial action while the vehicle is moving based on the determining the at least one sensor of the plurality of sensors has moved or is inoperative.

2. The system of claim 1, wherein the plurality of sensors includes an inertial measurement unit and at least one of: a lidar, a radar, and a camera.

3. The system of claim 1, wherein the intrinsic self-calibration routine comprises:
   determining at least one of: a rotation and a translation with respect to another sensor of the plurality of sensors.

4. The system of claim 1, wherein the at least one sensor is a camera and the at least one intrinsic calibration parameter value for that sensor is at least one of: a focal length, an optical center, a scale factor, a principal point, a skew, a distortion, a rolling shutter time, and a geometric distortion associated with the camera.

5. The system of claim 1, wherein the intrinsic self-calibration routine for that sensor includes comparing a first motion of a first object and a second motion of a second object different than the first object based on sensor data representing the first motion and the second motion captured by the at least one sensor from the plurality of sensors.

6. The system of claim 1, wherein the vehicle is operating in at least one of: a fully autonomous driving mode and a partially-autonomous driving mode prior to the determining the at least one sensor of the plurality of sensors has moved or is inoperative, and the at least one remedial action causes the vehicle to initiate a process to operate the vehicle in a manual driving mode.

7. The system of claim 1, wherein the vehicle is operating in a manual driving mode, and the at least one remedial action causes the vehicle to refrain from initiating a process to operate the vehicle in at least one of a fully autonomous driving mode and a partially-autonomous driving mode.

8. The system of claim 1, wherein the at least one sensor of the plurality of sensors is associated with a sensor type, and wherein the first predetermined acceptable range and the second predetermined acceptable range are determined based on a plurality of intrinsic calibration parameter values and a plurality of extrinsic calibration parameter values obtained prior to the at least one calibration parameter value and associated with at least one of: that the at least one sensor and at least one other sensor of the plurality of sensors associated with the sensor type.

9. The system of claim 1, wherein the intrinsic self-calibration routine comprises:
   estimating a first motion of the at least one sensor based on a search for features in an environment of the vehicle;
   estimating a second motion of at least one other sensor of the plurality of sensors; and
   comparing the first motion with the second motion.

10. The system of claim 1, wherein the extrinsic self-calibration routine comprises:
    determining the at least one extrinsic parameter value with respect to another sensor of the plurality of sensors based on at least one of: bundle adjustment, structure from motion, and hand/eye calibration.

11. A computer-implemented method comprising:
    performing, by a computing system, while a vehicle is moving, an intrinsic self-calibration routine and an extrinsic self-calibration routine for each sensor of a plurality of sensors to determine at least one intrinsic calibration parameter value and at least one extrinsic calibration parameter value associated with that sensor, wherein the at least one extrinsic calibration parameter value is associated with at least one of: weather, temperature, and vibration;
    determining, by the computing system, while the vehicle is moving, based on the intrinsic self-calibration routine and the extrinsic self-calibration routine, the at least one sensor of the plurality of sensors has moved or is inoperative based on at least one of: the at least one intrinsic calibration parameter value associated with the at least one sensor being outside a predetermined acceptable range for the at least one intrinsic calibration parameter value and the at least one extrinsic calibration parameter value associated with the at least one sensor being outside a second predetermined acceptable range for the at least one extrinsic calibration parameter value; and performing, by the computing system, at least one remedial action while the vehicle is moving based on the determining the at least one sensor of the plurality of sensors has moved or is inoperative.

12. The computer-implemented method of claim 11, wherein the plurality of sensors includes an inertial measurement unit and at least one of: a lidar, a radar, and a camera.

13. The computer-implemented method of claim 11, wherein the intrinsic self-calibration routine comprises:

determining, by the computing system, at least one of: a rotation and a translation with respect to another sensor of the plurality of sensors.

14. The computer-implemented method of claim 11, wherein the at least one sensor is a camera and the at least one intrinsic calibration parameter value for that sensor is at least one of: a focal length, an optical center, a scale factor, a principal point, a skew, a distortion, a rolling shutter time, and a geometric distortion associated with the camera.

15. The computer-implemented method of claim 11, wherein the intrinsic self-calibration routine for that sensor includes comparing a first motion of a first object and a second motion of a second object different than the first object based on sensor data representing the first motion and the second motion captured by the at least one sensor from the plurality of sensors.

16. A non-transitory computer-readable storage medium including instructions that, when executed by at least one processor of a computing system, cause the computing system to perform operations comprising:

performing, while a vehicle is moving, an intrinsic self-calibration routine and an extrinsic self-calibration routine for each sensor of a plurality of sensors to determine at least one intrinsic calibration parameter value and at least one extrinsic calibration parameter value associated with that sensor, wherein the at least one extrinsic calibration parameter value is associated with at least one of: weather, temperature, and vibration;

determining, while the vehicle is moving, based on the intrinsic self-calibration routine and the extrinsic self-calibration routine, the at least one sensor of the plurality of sensors has moved or is inoperative based on at least one of: the at least one intrinsic calibration parameter value associated with the at least one sensor being outside a predetermined acceptable range for the at least one intrinsic calibration parameter value and the at least one extrinsic calibration parameter value associated with the at least one sensor being outside a second predetermined acceptable range for the at least one extrinsic calibration parameter value; and performing, at least one remedial action while the vehicle is moving based on the determining the at least one sensor of the plurality of sensors has moved or is inoperative.

17. The non-transitory computer-readable storage medium of claim 16, wherein the plurality of sensors includes an inertial measurement unit and at least one of: a lidar, a radar, and a camera.

18. The non-transitory computer-readable storage medium of claim 16, wherein the intrinsic self-calibration routine comprises:

determining at least one of: a rotation and a translation with respect to another sensor of the plurality of sensors.

19. The non-transitory computer-readable storage medium of claim 16, wherein the at least one sensor is a camera and the at least one intrinsic calibration parameter value for that sensor is at least one of: a focal length, an optical center, a scale factor, a principal point, a skew, a distortion, a rolling shutter time, and a geometric distortion associated with the camera.

20. The non-transitory computer-readable storage medium of claim 16, wherein the intrinsic self-calibration routine for that sensor includes comparing a first motion of a first object and a second motion of a second object different than the first object based on sensor data representing the first motion and the second motion captured by the at least one sensor from the plurality of sensors.

* * * * *